(12) United States Patent
Nordman et al.

(10) Patent No.: US 7,194,760 B2
(45) Date of Patent: Mar. 20, 2007

(54) METHOD FOR PROTECTING PRIVACY WHEN USING A BLUETOOTH DEVICE

(75) Inventors: Ian Nordman, Söderkulla (FI); Tero Alamäki, Helsinki (FI); Marko Vänskä, Espoo (FI); Mikko Tarkiainen, Espoo (FI); Norbert Gyorbiró, Helsinki (FI); Casper Gripenberg, Helsinki (FI)

(73) Assignee: Nokia Corporation, Espoo (FI)

( * ) Notice: Subject to any disclaimer, the term of this patent is extended or adjusted under 35 U.S.C. 154(b) by 854 days.

(21) Appl. No.: 09/860,553

(22) Filed: May 21, 2001

(65) Prior Publication Data
US 2002/0174364 A1 Nov. 21, 2002

(51) Int. Cl.
*G06F 17/00* (2006.01)

(52) U.S. Cl. .................... 726/5; 726/4; 726/3

(58) Field of Classification Search ........ 713/200–202; 726/3, 4, 5
See application file for complete search history.

(56) References Cited

U.S. PATENT DOCUMENTS

| | | | |
|---|---|---|---|
| 5,159,592 A | 10/1992 | Perkins | |
| 5,457,737 A | 10/1995 | Wen | |
| 5,521,980 A | 5/1996 | Brands | |
| 5,585,816 A | 12/1996 | Scheffer et al. | |
| 5,754,938 A | 5/1998 | Herz et al. | |
| 5,931,968 A | 8/1999 | Gray | |
| 6,216,014 B1 | 4/2001 | Proust et al. | |

FOREIGN PATENT DOCUMENTS

EP 1 113 641 7/2001

OTHER PUBLICATIONS

Securing wireless data: system architecture challenges; Ravi, S.; Raghunathan, A.; Potlapally, N.; System Synthesis, 2002. 15th International Symposium on 2002 pp.: 195-200.*
Experiments in wireless Internet security; Gupta, V.; Gupta, S.; Wireless Communications and Networking Conference, 2002. WCNC2002. 2002 IEEE vol. 2, Mar. 17-21 2002 pp.: 860-864 vol. 2.*
Wireless security policy development for sensitive organizations; Manley et al.; Systems, Man and Cybernetics (SMC) Information Assurance Workshop, 2005. Proceedings from the Sixth Annual IEEE pp.: 150-157.*

* cited by examiner

*Primary Examiner*—David Jung
(74) *Attorney, Agent, or Firm*—Morgan & Finnegan, LLP (57) ABSTRACT

The user's Bluetooth device substitutes a pseudonym address for the Bluetooth Device Address (BD_ADDR). The pseudonym address is a randomized version of the BD_ADDR. The pseudonym address is used in all the functions of the Bluetooth device that normally use the BD_ADDR, including the frequency hopping sequence, the device access code, the initialization key in link encryption, the authentication code, and the various packet addresses. In this manner, the user's privacy is protected by preventing the user's identity, routes, and activities from being correlated with his/her device's address. In addition to the Bluetooth standard, the technique also applies to other wireless standards.

78 Claims, 6 Drawing Sheets

FIG. 4C  BLUETOOTH PACKET STRUCTURE FOR A PAGING PACKET SENT BY USER'S DEVICE 100 TO PAGED DEVICE

FIG. 4D  BLUETOOTH PACKET STRUCTURE FOR A PAGE ACKNOWLEDGMENT PACKET SENT BY PAGED DEVICE TO USER'S DEVICE 100

METHOD FOR PROTECTING PRIVACY WHEN USING A BLUETOOTH DEVICE

FIELD OF THE INVENTION

The invention disclosed broadly relates to ubiquitous computing and more particularly relates to improvements in short range RF technology.

BACKGROUND OF THE INVENTION

Bluetooth is a global de facto standard for wireless connectivity, which is based on a low-cost, short-range radio link. When two Bluetooth equipped devices come within ten meters range of each other, they can establish a connection together using a radio-based link. A Bluetooth-enabled laptop computer can send information to a printer in the next room, or a microwave oven can send a message to one's mobile phone announcing that that the meal is ready. Bluetooth will become the standard in mobile phones, PCs, laptops and other electronic devices, enabling users to share information, synchronize data, access the Internet, integrate with LANs or actuate electromechanical devices, such as unlocking a car. A passenger can write e-mails on his/her laptop on an airplane and then, after landing, the messages can be automatically forwarded to the Internet by Bluetooth devices that are ubiquitously located around the airport terminal. In another example, while waiting in an airport lounge, a the passenger can receive interesting duty-free offers directly on his/her mobile phone or play multiplayer games with friends.

Bluetooth devices are designed to find other Bluetooth devices within their ten meter communications range and to discover what services they offer, using a service discovery protocol (SDP). To accomplish this, a Bluetooth device sends out an inquiry message searching for other devices in its vicinity. Any other Bluetooth device that is listening by means of conducting an inquiry scan, will recognize the inquiry message and respond. The inquiry response is a message packet containing the responding device's Bluetooth Device Address (BD_ADDR). The Bluetooth device address is a unique, 48-bit IEEE address which is electronically engraved into each Bluetooth device. The address is virtually guaranteed to be completely unique, so much so that it can be reliably associated with the device's user, much as can the user's passport number or social security number.

As the user carries his/her Bluetooth device about, traveling among other Bluetooth devices, a trail is left in the form of the user's Bluetooth Device Address (BD_ADDR), which the device has given out at each transmission of an inquiry response packet. The user's routes and activities can be tracked by logging the times and locations of the observance of his/her device's Bluetooth Device Address. To the extent that the user is identified with his/her device's Bluetooth Device Address, it is almost as if the user were giving out his/her personal identity number to each inquiring Bluetooth device. This realization will certainly be exploited in the future by market researchers, and possibly by more sinister observers, thereby seriously compromising the user's privacy and possibly the user's safety.

What is needed is a way to provide a pseudonym for a Bluetooth device so that the user's identity, routes, and activities cannot be correlated with his/her device's address.

SUMMARY OF THE INVENTION

In accordance with the invention, the user's Bluetooth device substitutes a pseudonym address for the Bluetooth Device Address (BD_ADDR). The pseudonym address is a randomized version of the BD_ADDR. The pseudonym address is used in all the functions of the Bluetooth device that normally use the BD_ADDR, including the frequency hopping sequence, the device access code, the initialization key in link encryption, the authentication code, and the various packet addresses.

The user is provided with a menu of privacy options, to select the various features of the invention. Since the BD_ADDR includes a manufacturer's code part, the user is given the option of preserving that part and randomizing the rest of the BD_ADDR. The user can select other parts or all of the BD_ADDR to randomize.

The user can select introducing various parameters into the random number generator as initialization vectors to combine with the BD_ADDR, such as time-of-day clock values or biometric values such as keyboard latency, to change the random number sequence and thus thwart an eavesdropper's discovery of that sequence. The resulting randomized pseudonym address is then stored in an address manager table, associating it with the paired Bluetooth devices with which the pseudonym address is exchanged.

For example, when the user's device receives an inquiry message from another Bluetooth device, it sends back an inquiry response message that contains the user's pseudonym address instead of his/her device's BD_ADDR. As another example, when the user's device has the role of a master device connected to a slave device in a piconet, then the user's pseudonym address is used as the piconet access code, instead of his/her device's BD_ADDR.

The user is also given a number of options for the retention of the pseudonym address in the address manager table. The anonymity of the user would otherwise be undermined if the same pseudonym address were to be used indefinitely. In accordance with the invention, the address can be retained for a predetermined time or count selected by the user. Alternately, the address can be retained for a duration that at least begins with an inquiry received from another device and ends if no connection is made after the inquiry. Similarly, if the user's device initiated sending an inquiry message, the address can be retained for a duration that at least begins with the inquiry and ends if no connection is made after the inquiry. Pseudonym addresses can be computed prior to when they are needed, and then stockpiled by storage in a table in the user's device.

In an alternate option, the pseudonym address can be retained for a duration that ends when a piconet context changes for the user's device. When the user's device is the master device in a piconet, the pseudonym address will be used in the piconet access code. Thus, the user's device will retain the pseudonym address until the piconet is broken up or until the user's device relinquishes its role as the master device. Alternately, the address can be retained for a duration that at least begins with the sensing of the current physical location of the user's device, and ends if that physical location changes beyond a predefined distance, such as the nominal radio broadcast range of a Bluetooth device. Alternately, the address can be retained for a duration that at least begins with an inquiry that establishes a connection with another device, and ends when that connection is torn down or otherwise terminated. In this way it is not possible to track the usage of the user's device nor discover the real, unique BD_ADDR of the device.

Still further in accordance with the invention, even though the user device's BD_ADDR has been randomized in the form of the pseudonym address, there is still a small chance that the resulting pseudonym address is coincidentally the same as another device's BD_ADDR in the vicinity. The invention minimizes this possibility by comparing the newly generated pseudonym address with known addresses of all other devices that have been encountered in the vicinity. If the rare chance happens that the pseudonym address is the same as another device's address, the newly generated pseudonym address is not used and another pseudonym address is generated instead. If there are many repeated attempts to generate a pseudonym address that fail because of other duplicate addresses in the vicinity, then the user is notified and he/she can elect to use his/her device's BD_ADDR for the proposed connection. This unlikely occurrence may be a symptom revealing that an eavesdropper is trying to discover the sequence of random numbers being generated by the user's device. The user's device in this case notifies the user and gives him/her the option to introduce various parameters into the random number generator to change the random number sequence and thus thwart the eavesdropper's discovery of that sequence.

In addition to the Bluetooth standard, the invention also applies to other wireless standards. The invention's principle of substituting randomized pseudonym addresses for the device's real unique address, to confer anonymity upon the user, is equally useful in many other wireless standards. The invention applies, for example, to the IEEE 802.11 Wireless LAN standards, the Japanese 3rd Generation (3G) wireless standard, the various 2G, 2.5G, and 3G cellular telephone system standards, the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the High Performance Radio Local Area Network (HIPERLAN) standard, and the Multimedia Mobile Access Communication (MMAC) Systems standard of the Japanese Association of Radio Industries and Businesses. The invention enables each of these wireless standards to protect the privacy of the user's identity, routes, and activities so that they cannot be correlated with his/her device's address.

DISCUSSION OF THE PREFERRED EMBODIMENT

The Bluetooth Special Interest Group, *Specification Of The Bluetooth System*, Version 1.0B, Volumes 1 and 2, December 1999, describes the principles of Bluetooth device operation and communication protocols. Up to eight Bluetooth devices can join together in an ad hoc communications network called a piconet. A piconet is an arbitrary collection of Bluetooth-enabled devices which are physically close enough to be able to communicate and which are exchanging information on a regular basis. Each piconet has one master device and up to seven slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as collaborative work projects, collaborative games, multi-user gateways to the Internet, and the like. A user's device that joins a particular piconet, does so to enable its user to participate in the currently running collaborative activity.

Figure 1:
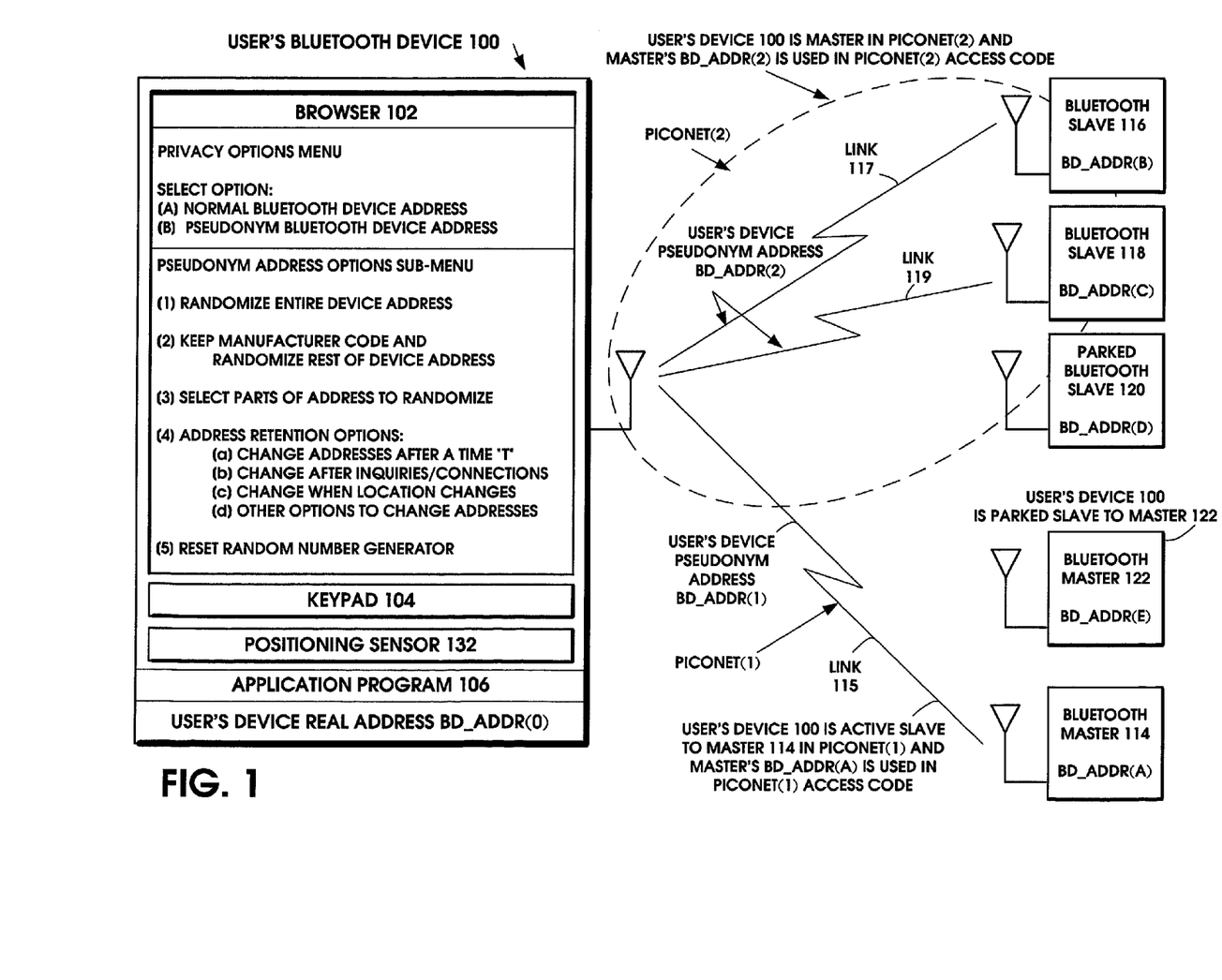
FIG. 1 is a network diagram showing several ad hoc network piconets and the user's Bluetooth device 100 which is displaying the privacy options menu.

FIG. 1 is a network diagram showing several ad hoc network piconets and the user's Bluetooth device 100 which is displaying the privacy options menu in the browser 102. The user's Bluetooth device 100 includes the keypad 104 and the positioning sensor 132. The positioning sensor 132 can be, for example, a GPS receiver integrated in the device. The positioning sensor 132 can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". The sensor 132 provides inputs which are sampled by the wireless device 100 to infer a current geographical position. The positioning sensor 132 can also detect changes in position with respect to known, fixed station Bluetooth devices.

Several other Bluetooth devices are within the operating range of the user's device 100 of FIG. 1. In accordance with the invention, the user's Bluetooth device has substituted a different pseudonym address for its real Bluetooth Device Address BD_ADDR(0) in its relationship with each of the respective devices of FIG. 1. The user's device 100 forms an ad hoc network piconet(1) with Bluetooth device 114 on link 115. The user's Bluetooth device is using a pseudonym address BD_ADDR(1) instead of its real BD_ADDR(0) in its relationship with Bluetooth device 114. Bluetooth device 114 uses its real Bluetooth Device Address BD_ADDR(A). Since in the piconet(1), the user's device 100 has the role of the active slave device connected to a master device 114 in the piconet(1), then the master's real Bluetooth Device Address BD_ADDR(A) is used as the piconet access code. The address manager table 232 shown in FIG. 2 stores the user's pseudonym address BD_ADDR(L1) instead of its real BD_ADDR(0) for its relationship with Bluetooth device 114.

Contrast this with ad hoc network piconet(2) in FIG. 1. The user's device 100 forms ad hoc network piconet(2) with Bluetooth device 116 on link 117. The user's Bluetooth device is using a different pseudonym address BD_ADDR(2) instead of its real BD_ADDR(0) in its relationship with Bluetooth device 116. Bluetooth device 116 uses its real Bluetooth Device Address BD_ADDR(13). Since in the piconet(2), the user's device 100 has the role of the master device connected to a slave device 116, then the user's pseudonym address BD_ADDR(2) used as the piconet access code, instead of the user's real Bluetooth Device Address BD_ADDR(0). The address manager table 232 shown in FIG. 2 stores the user's pseudonym address BD_ADDR(2) instead of its real BD_ADDR(0) for its relationship with Bluetooth device 116.

There is another active slave device in ad hoc network piconet(2) of FIG. 1, the Bluetooth device 118 connected on link 119. Bluetooth device 118 uses its real Bluetooth Device Address BD_ADDR(C). Since in the piconet(2) of FIG. 1, the user's device 100 is the master device connected to slave device 118, then the user's pseudonym address BD_ADDR(2) is used as the piconet access code for slave device 118, as well as slave device 116. The address manager table 232 shown in FIG. 2 stores the user's pseudonym address BD_ADDR(2) instead of its real BD_ADDR(0) for its relationship with Bluetooth device 118.

There is also a parked slave device in ad hoc network piconet(2) of FIG. 1, the Bluetooth device 120. Although Bluetooth device 120 does not have an active connection with the user's master device 100, it does monitor the signals from the user's master device 100 to stay in synchronism with the master's clock. Bluetooth device 120 uses its real Bluetooth Device Address BD_ADDR(D). If the parked slave Bluetooth device 120 were to rejoin piconet(2) as an active slave device, it would employ the user master device's pseudonym address BD_ADDR(2) as the piconet access code, the same as for slave device 118 and slave device 116. The address manager table 232 shown in FIG. 2 stores the user's pseudonym address BD_ADDR(2) instead of its real BD_ADDR(0) for its relationship with Bluetooth device 120.

The user's device 100 in FIG. 1 is, itself, a parked slave device in a third ad hoc network piconet(3), with the master Bluetooth device 122. Although the user's device 100 does not have an active connection with the master device 122 in piconet(3), it does monitor the signals from the master device 122 to stay in synchronism with the master's clock. The master device 122 uses its real Bluetooth Device Address BD_ADDR(E). If the user's parked slave device 120 were to rejoin piconet(3) as an active slave device, it would employ the master device's real Bluetooth Device Address BD_ADDR(E) as the piconet access code. The address manager table 232 shown in FIG. 2 stores the user's pseudonym address BD_ADDR(3) instead of its real BD_ADDR(0) for its relationship with Bluetooth device 122.

FIG. 1 shows the user's Bluetooth device 100 displaying the privacy options menu in the browser 102. The privacy options menu is rendered on the device's display by the application program 106 of FIG. 3. The user can select one of two primary options:
PRIVACY OPTIONS MENU
SELECT OPTION:
  [A] NORMAL BLUETOOTH DEVICE ADDRESS
  [B] PSEUDONYM BLUETOOTH DEVICE ADDRESS
If the user selects the PSEUDONYM BLUETOOTH DEVICE ADDRESS option in the privacy options menu in the browser 102, then the user can select one of five options in the PSEUDONYM ADDRESS OPTIONS SUB-MENU:
  [1] RANDOMIZE ENTIRE DEVICE ADDRESS
  [2] KEEP MANUFACTURER CODE AND RANDOMIZE REST OF DEVICE ADDRESS
  [3] SELECT PARTS OF ADDRESS TO RANDOMIZE
  [4] ADDRESS RETENTION OPTIONS
  [5] RESET RANDOM NUMBER GENERATOR The option [1] RANDOMIZE ENTIRE DEVICE ADDRESS from the privacy options menu in the browser 102, randomizes the entire 48-bits of the user's real BD_ADDR(0) to produce the pseudonym address.

The 48-bits of the user's real BD_ADDR(0) is partitioned into three parts: the 24-bit lower address part (LAP), the 8-bit upper address part (UAP), and the 16-bit nonsignificant address part (NAP). The 24 bits of the UAP and the NAP constitute the organization unique identifier (OUI), which is the manufacturer's code. The remaining 24 bits of the LAP are assigned internally by the manufacturer. If the user selects from the privacy options menu in the browser 102, the option [2] KEEP MANUFACTURER CODE AND RANDOMIZE REST OF DEVICE ADDRESS, then only the 24-bit LAP of the user's real BD_ADDR(0) is randomized to produce the pseudonym address. If the user selects from the privacy options menu in the browser 102, the option [3] SELECT PARTS OF ADDRESS TO RANDOMIZE, then the user can select combinations of the LAP, UAP, and/or NAP of the user's real BD_ADDR(0) to randomize to produce the pseudonym address.

Figure 2A:
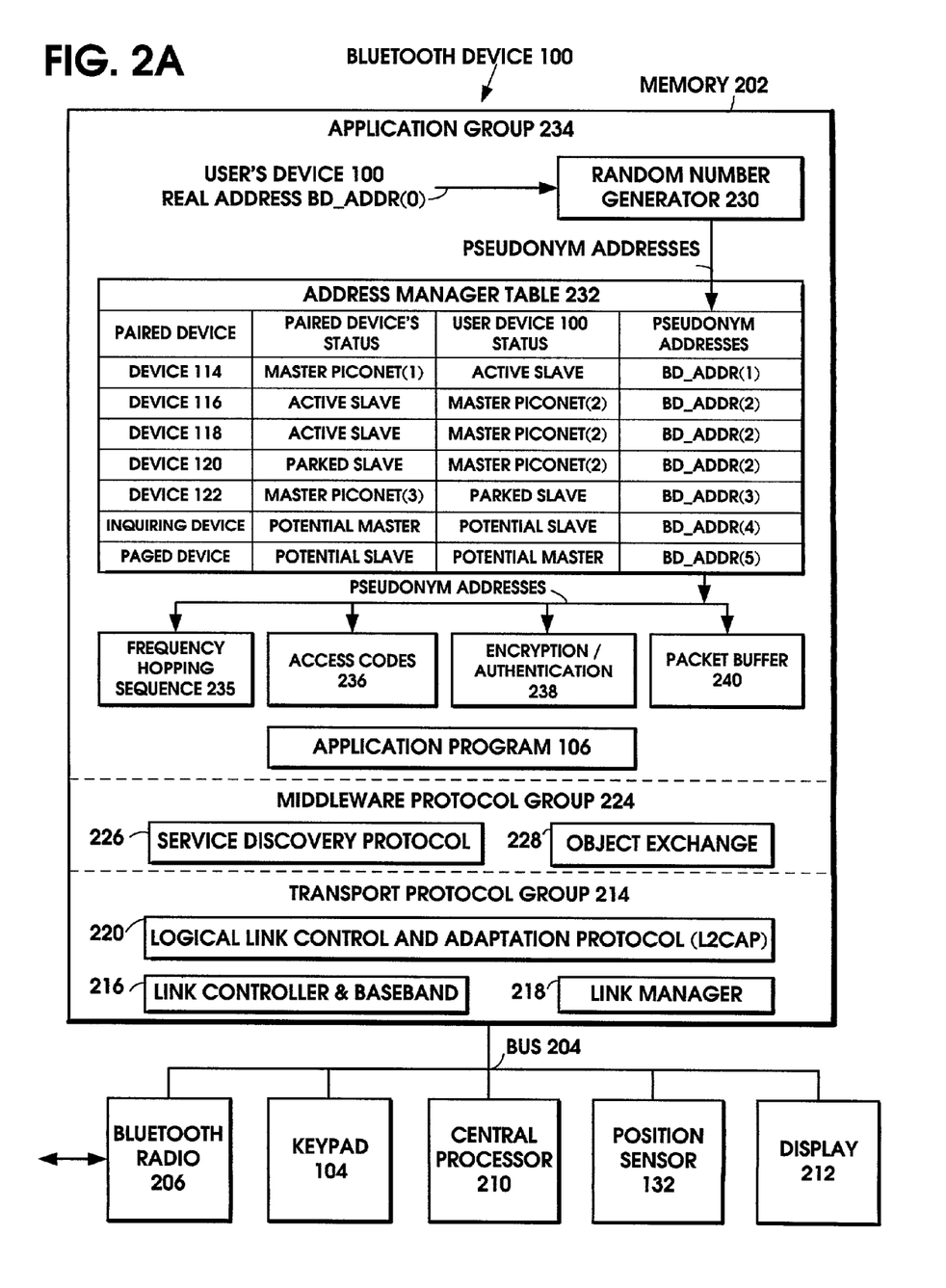
FIG. 2A is a functional block diagram of the user's Bluetooth device 100 of FIG. 1, showing the various program modules stored in its memory for the transport protocol group, middleware protocol group, and application group.
Figure 2B:
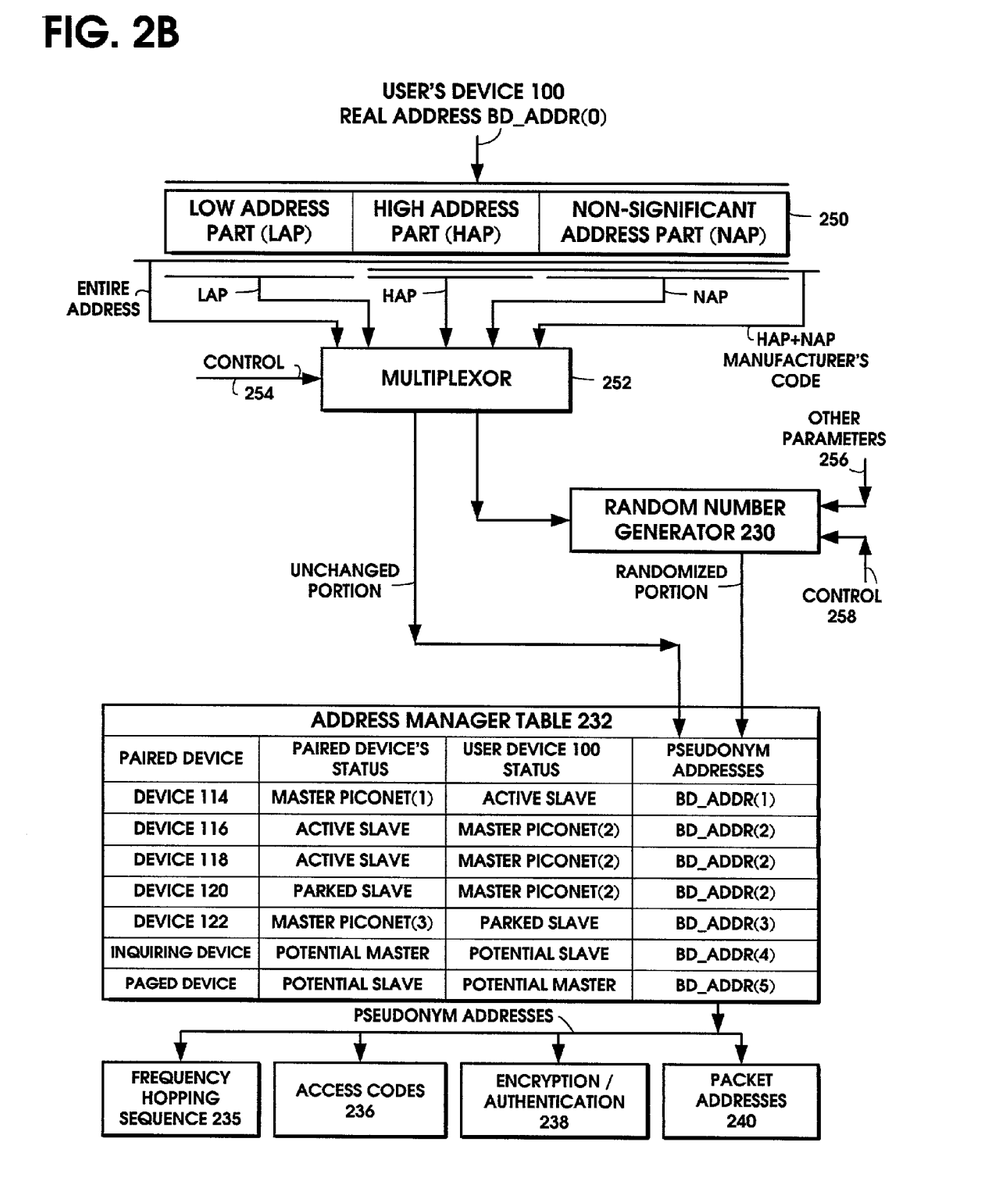
FIG. 2B shows an example of the random number generator operating on various selected parts of the BD_ADDR of the user's Bluetooth device 100.

Reference to FIG. 2B shows an example of the random number generator 230 operating on various selected parts of the user device's BD_ADDR(0) stored in the buffer 250. When the user makes a selection from the privacy options menu in the browser 102 in FIG. 1, the multiplexer 252 connects to the selected part of the user device's BD_ADDR(0) stored in the buffer 250 and applies the selected part to the input of the random number generator 230.

If the user selects the option [4] ADDRESS RETENTION OPTIONS in the privacy options menu in the browser 102 of FIG. 1, then the user can select one of four options in the sub-menu:
  [a] CHANGE ADDRESSES AFTER A TIME "T"
  [b] CHANGE AFTER INQUIRIES/CONNECTIONS
  [c] CHANGE WHEN LOCATION CHANGES
  [d] OTHER OPTIONS TO CHANGE ADDRESSES
If the user selects the option [a] CHANGE ADDRESSES AFTER A TIME "T" in the privacy options menu in the browser 102 of FIG. 1, then the pseudonym address can be retained for a predetermined time or count selected by the user. The method for carrying out this option is shown in steps 320 to 332 of the flow diagram of FIG. 3.

If the user selects the option [b] CHANGE AFTER INQUIRIES/CONNECTIONS in the privacy options menu in the browser 102 of FIG. 1, then the pseudonym address can be retained for a duration that at least begins with an inquiry received from another device and ends if no connection is made after the inquiry. Similarly, if the user's device initiated sending an inquiry message, the address can be retained for a duration that at least begins with the inquiry and ends if no connection is made after the inquiry. Pseudonym addresses can be computed prior to when they are needed and then stockpiled by storage in the address management table 234 in the user's device 100. The user can also select that the address be retained for a duration that ends when a piconet context changes for the user's device. When the user's device 100 is the master device in a piconet, such as piconet(2) of FIG. 1, its pseudonym address will be used in the piconet access code. Thus, the user's device 100 will retain the pseudonym address until the piconet is broken up or until the user's device 100 relinquishes its role as the master device of that piconet. The user can also select that the pseudonym address be retained for a duration that at least begins with an inquiry that establishes a connection with another device, and ends when that connection is torn down or otherwise terminated. The method for carrying out this option is shown in steps 306 to 318 of the flow diagram of FIG. 3.

If the user selects the option [c] CHANGE WHEN LOCATION CHANGES in the privacy options menu in the browser 102 of FIG. 1, then the pseudonym address can be retained for a duration that at least begins with the sensing of the current physical location of the user's device by the sensor 132, and ends if that physical location changes beyond a predefined distance, such as the nominal radio broadcast range of ten meters for a Bluetooth device. The method for carrying out this option is shown in steps 306 to 318 of the flow diagram of FIG. 3.

The user can also select the option [d] OTHER OPTIONS TO CHANGE ADDRESSES in the privacy options menu in the browser 102 of FIG. 1. With any of these options [a], [b], [c], or [d], it is more difficult for an eavesdropper to track the usage of the user's device or discover the real, unique BD_ADDR of the device.

If the user selects the option [5] RESET RANDOM NUMBER GENERATOR in the privacy options menu in the browser 102 of FIG. 1, then the user can introduce various parameters into the random number generator to change the random number sequence and thus thwart the eavesdropper's discovery of that sequence.

FIG. 2A is a functional block diagram of the user's Bluetooth device 100 of FIG. 1, showing the various program modules stored in its memory 202 for the transport protocol group 214, middleware protocol group 224, and application group 234. The memory 202 is connected by the bus 204 to the Bluetooth radio 206, the keypad 104, the positioning sensor 132, the central processor 210, and the display 212. Program modules stored in the memory 202 are sequences of operational instructions which, when executed by the central processor 210, carry out the methods of the invention.

Figure 3:
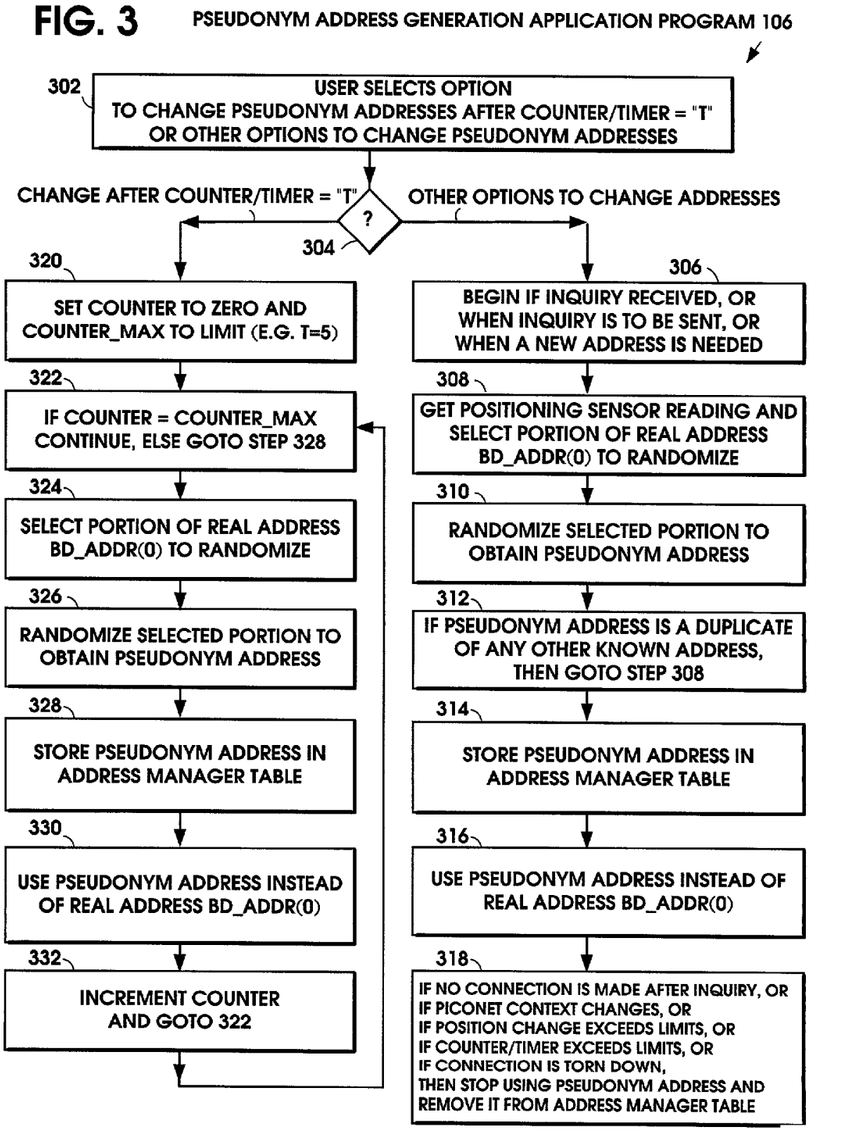
FIG. 3 is a flow diagram of the pseudonym address generation application program 106.

The application group 234 includes the application program 106, shown in greater detail in the flow diagram of FIG. 3. The application group 234 also includes the random number generator 230 which randomizes the user's real BD_ADDR(0) to produce the pseudonym addresses which it outputs to the address manager table 232, shown in greater detail in FIG. 2B. The application group 234 also includes the frequency hopping sequence module 235, the device access code module 236, the encryption and authentication module 238, and the packet buffer 240. The pseudonym addresses in the address manager table 232 are output to the modules 235, 236, 238, and 240 to be used in all the functions of the Bluetooth device that normally use the BD_ADDR, including the frequency hopping sequence, the device access code, the initialization key in link encryption, the authentication code, and the various packet addresses. Frequency hopping is the form of spread spectrum modulation used by the Bluetooth standard.

The middleware protocol group 224 in FIG. 2 includes the Service Discovery Protocol 226 and the Object Exchange 228. The transport protocol group 214 includes the Logical Link Control and Adaptation Protocol (L2CAP) 220, the Link Controller and Baseband 216, and the Link Manager 218. The Link Controller carries out link level operations over several packet durations in response to higher level commands from the Link Manager. The Baseband handles channel coding and decoding and low level timing control and management of the link within a single data packet transfer.

FIG. 2B shows the user's BD_ADDR(0) stored in the buffer 250. Combinations of the lower address part (LAP), the upper address part (UAP), and the non-significant address part (NAP) are selected by the multiplexer 252 in response to the control input 254 from the privacy options menu in the browser 102 of FIG. 1. When the user makes a selection from the privacy options menu in the browser 102 in FIG. 1, the multiplexer 252 connects to the selected part of the user device's BD_ADDR(0) stored in the buffer 250 and applies the selected part to the input of the random number generator 230. The remaining unchanged portion of the user device's BD_ADDR(0) is directly stored in the address manager table 252, to be concatenated with the selected, randomized portion output from the random number generator 230.

The random number generator 230 can be a pseudorandom sequence generator which is seeded with the user device's BD_ADDR(0). Still further, in response to the user's control input 258, the pseudo-random sequence generator can also be seeded with a true random sequence applied at the parameter input 256 of the random number generator 230. The true random sequence is combined with the BD_ADDR(0) in the random number generator 230. Examples of sources of a true random sequence include tables of random digits, random noise sources, the least significant bits from a clock register, and measurements of keyboard latency. Other sources of true random numbers are described in the Internet Engineering Task Force (IETF) Request For Comment (RFC) 1750. These true random number values can be used as seed values that are combined with the user device's BD_ADDR(0) by concatenation, exclusive-ORing, or other combination. Suitable pseudo-random sequence generators include the ANSI A9.17 pseudo-random number generator, and one-way function generators such as the MD5 cryptographic hash algorithm described in the RFC 1321, the SHA-1 cryptographic hash algorithm which is a U.S. NIST standard, or the Data Encryption Standard (DES) block cipher function. These various techniques for generating pseudo-random sequences that are seeded with true random numbers are described, for example in the book by A. J. Menezes, P. C. van Oorschot, and S. A. Vanstone, *Handbook of Applied Cryptography*, CRC Press, 1997.

FIG. 3 is a flow diagram of the sequence of operational steps of the pseudonym address generation application program 106. The program begins with step 302:

Step 302: USER SELECTS OPTION TO CHANGE PSEUDONYM ADDRESSES AFTER COUNTER/TIMER="T" OR OTHER OPTIONS TO CHANGE PSEUDONYM ADDRESSES.

The program then flows to step 304 to determine whether the user has selected option [a] of the privacy options menu in the browser 102, to change the pseudonym addresses after counter/timer="T" or other options to change pseudonym addresses. These other options include options [b], [c], or [d] of the privacy options menu in the browser 102.

If the user has selected option [a], then the program then flows to steps 320 to 332, which flow as follows:

Step 320: SET COUNTER TO ZERO AND COUNTER_MAX TO LIMIT (E.G. T=5)

Step 322: IF COUNTER=COUNTER_MAX CONTINUE, ELSE GOTO STEP 328

Step 324: SELECT PORTION OF REAL ADDRESS BD_ADDR(0) TO RANDOMIZE

Step 326: RANDOMIZE SELECTED PORTION TO OBTAIN PSEUDONYM ADDRESS

At step 326 if the pseudonym address is a duplicate of any other known address, then the program can return to step 324.

Step 328: STORE PSEUDONYM ADDRESS IN ADDRESS MANAGER TABLE

Step 330: USE PSEUDONYM ADDRESS INSTEAD OF REAL ADDRESS BD_ADDR(0)

Step 332: INCREMENT COUNTER AND GOTO 322

As a result of the user selecting option [a] of the privacy options menu in the browser 102, it is more difficult for an eavesdropper to track the usage of the user's device or discover the real, unique BD_ADDR of the device.

Returning to step 304, if the user has selected other options [b], [c], or [d] of the privacy options menu in the browser 102, to change pseudonym addresses, then the program then flows to steps 306 to 318, which flow as follows:

Step 306: BEGIN IF INQUIRY RECEIVED, OR WHEN INQUIRY IS TO BE SENT, OR WHEN A NEW ADDRESS IS NEEDED Note that pseudonym addresses can be computed prior to when they are needed and then stockpiled by storage in the address management table 234 in the user's device 100.

Step 308: GET POSITIONING SENSOR READING AND SELECT PORTION OF REAL ADDRESS BD_ADDR(0) TO RANDOMIZE Step 310: RANDOMIZE SELECTED PORTION TO OBTAIN PSEUDONYM ADDRESS Step 312: IF PSEUDONYM ADDRESS IS A DUPLICATE OF ANY OTHER KNOWN ADDRESS, THEN GOTO STEP 308

Step 314: STORE PSEUDONYM ADDRESS IN ADDRESS MANAGER TABLE

Step 316: USE PSEUDONYM ADDRESS INSTEAD OF REAL ADDRESS BD_ADDR(0)

Step 318: IF NO CONNECTION IS MADE AFTER INQUIRY, OR
  IF PICONET CONTEXT CHANGES, OR
  IF POSITION CHANGE EXCEEDS LIMITS, OR
  IF COUNTER/TIMER EXCEEDS LIMITS, OR
  IF CONNECTION IS TORN DOWN,
  THEN STOP USING PSEUDONYM ADDRESS AND REMOVE IT FROM ADDRESS MANAGER TABLE As a result of the user selecting other options [b], [c], or [d] of the privacy options menu in the browser 102, it is more difficult for an eavesdropper to track the usage of the user's device or discover the real, unique BD_ADDR of the device.

Figures 4A, 4B:
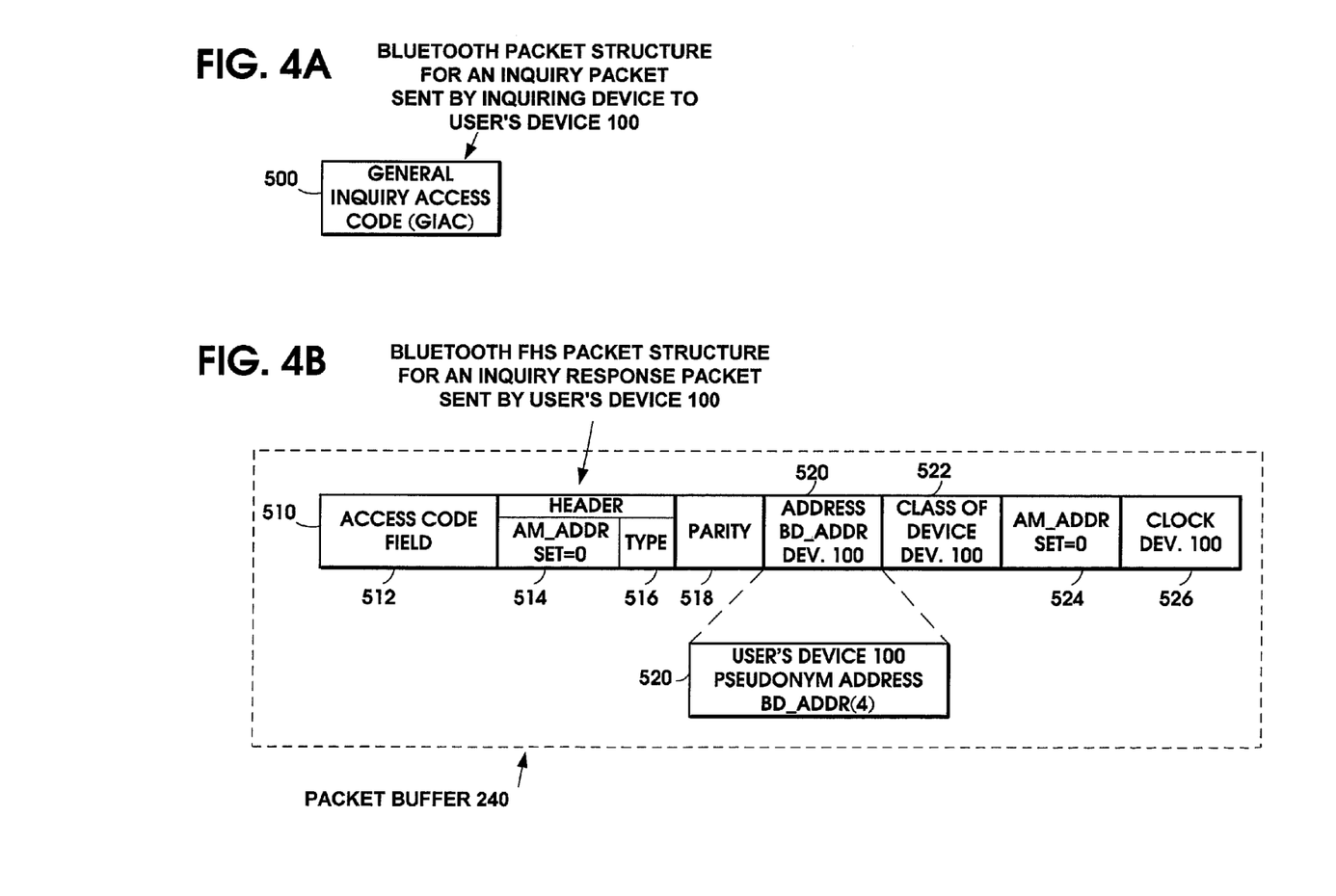
FIG. 4A shows the Bluetooth packet structure for an inquiry packet sent to the user's device 100 by an inquiring device.
FIG. 4B shows the Bluetooth packet structure for an inquiry response packet sent by the user's device 100 to the inquiring device.

FIG. 4A shows the Bluetooth packet structure for an inquiry packet sent to the user's device 100 by an inquiring device. In the inquiring device, its link controller is called to send inquiries to other Bluetooth devices in the area, such as the user's device 100, and to build an inquiry response table. At any particular time a Bluetooth device is in one of several different states. If the inquiring device is in the standby state, it is inactive, no data is being exchanged, and its Bluetooth radio is not on. Its link controller is invoked to enter the inquiry state and to begin the process of attempting to discover all Bluetooth devices in the ten meter communications range. The inquiring device begins to periodically transmit inquiry packets. FIG. 4A shows the Bluetooth packet structure for an inquiry packet 500 sent by an inquiring device to the user's device 100. The general inquiry access code (GLAC) of the packet 500 is recognized by all Bluetooth devices as an inquiry message.

During the inquiry procedure, any other Bluetooth devices that are in the inquiry scan state, such as the user's device 100, are scanning for the receipt of inquiry packets 500. If the user's device 100 in the inquiry scan state receives the inquiry packet 500, it will respond with an inquiry response packet 510 that has sufficient information to enable the inquiring device to build its inquiry response table of essential information required to make a connection. Any Bluetooth device recognizing inquiry packet 500 can respond. FIG. 4B shows the Bluetooth frequency hop synchronization (FHS) packet structure for an inquiry response packet 510 sent by the user's device 100. FIG. 4B also shows the packet buffer 240 of FIG. 2A, in which the packet 510 has been constructed by the user's device 100. The FHS packet structure for an inquiry response packet 510 sent by the user's device 100 includes the access code field 512, the header which includes the slave member number field 514 in which AM_ADDR is no yet assigned and is set to zero, the type field 516 and the parity field 518. Another the slave member number field 524 also has AM_ADDR set to zero. Field 522 contains the user's class-of-device (CoD) information.

There are two important fields in the FHS packet structure for an inquiry response packet 510, that provide essential information about the user's device 100 that enable the inquiring device to the make a connection to the user's device: Field 520 which normally contains the user's real BD_ADDR and field 526 which normally contains the user's current clock value. In accordance with the invention, the user's device 100 substitutes a pseudonym address BD_ADDR(4) for the user's Bluetooth Device Address BD_ADDR(0). The address manager table 232 shown in FIG. 2 stores the user's pseudonym address BD_ADDR(4) instead of its real BD_ADDR(0) for its relationship with the inquiring device. As a result, the inquiring device cannot track the usage of the user's device 100 or discover the real, unique BD_ADDR(0) of the device 100.

Another option available to the user to confuse an eavesdropper, is selectively changing the user's class-of-device (CoD) information in field 522 of the FHS inquiry response packet 510 of FIG. 4B.

As another example of the invention, the user's device 100 initiates a connection with another device. The device 100 uses the information provided in a prior inquiry response packet it has received from a remote device to be paged, to prepare and send a paging messages to the remote, paged device. To establish a connection, the user's paging device 100 must enter the page state. The user's device 100 invokes the link controller 216 to enter the page state, where it will transmit paging messages to the remote paged device using the access code and timing information acquired from a prior inquiry response packet. The remote paged device must be in the page scan state to allow the user's paging device 100 to connect with it. Once in the page scan state, the remote paged device will acknowledge the paging messages and the user's paging device 100 will send a paging packet 530 shown in FIG. 4C, which provides the clock timing and access code of the paging device 100 to the remote paged device. The remote paged device responds with a page acknowledgment packet 550 shown in FIG. 4D. This enables the two devices to form an asynchronous connection-less (ACL) link and both devices transition into the connection state.

Figure 4C:
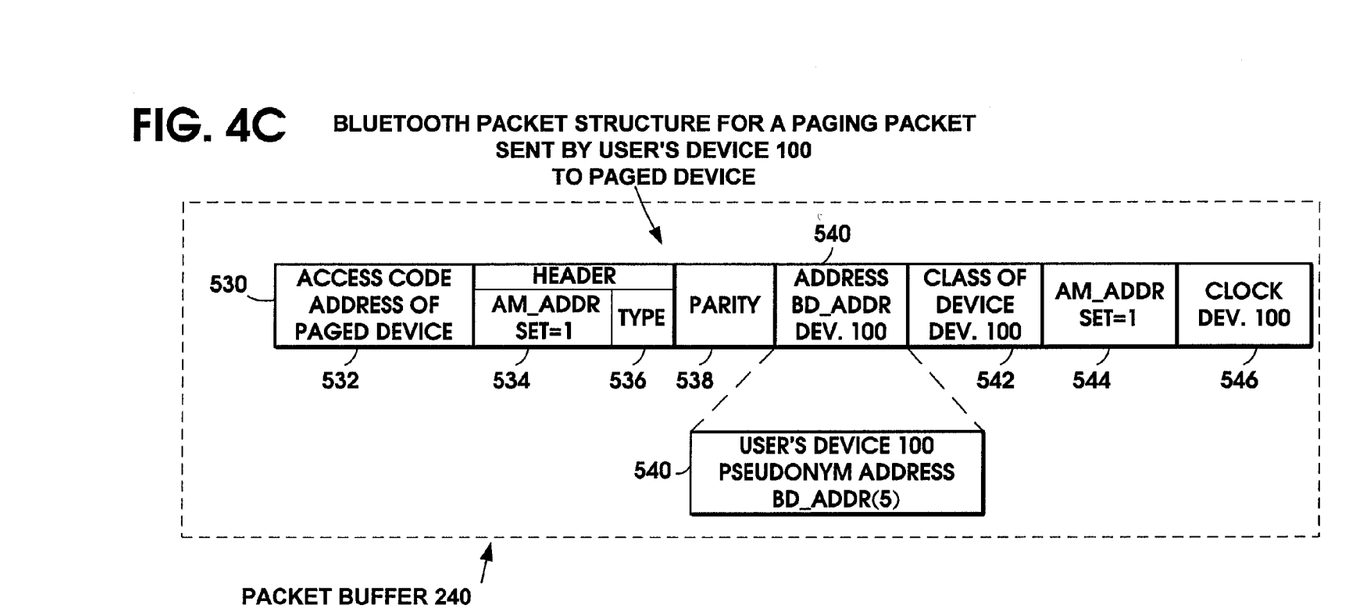
FIG. 4C shows the Bluetooth packet structure for a paging packet sent by the user's device 100 to a paged device.

When the user's device 100 sends a paging message to the other device, it sends the FHS paging packet 530 of FIG. 4C.

The FHS paging packet 530 must have sufficient information about the user's device 100 to enable the remote paged device to synchronize itself with the clock of the user's device 100. Since the user's device 100 has initiated the page, it will be the master device in the new piconet being formed by the two devices. Importantly, the remote paged device, which will become the slave to the user's device 100, must also know the user device's BD_ADDR, since it is the master device's address that is used in the piconet access code for the new piconet being formed by the two devices. FIG. 4C shows the Bluetooth frequency hop synchronization (FHS) packet structure for the paging packet 530 sent by the user's device 100. FIG. 4C also shows the packet buffer 240 of FIG. 2A, in which the packet 530 has been constructed by the user's device 100. The FHS packet structure for a paging packet 530 sent by the user's device 100 includes the access code field 532 which contains the remote paged device's BD_ADDR, the header which includes the slave member number field 534 in which AM_ADDR is now assigned the value of one, the type field 536 and the parity field 538. Another the slave member number field 544 also has AM_ADDR set to one. Field 542 contains the user device's class-of-device (CoD) information.

There are two important fields in the FHS packet structure for the paging packet 530, that provide the essential information about the user's device 100 that enables the remote paged device to the make the connection to the user's device: Field 540 which normally contains the user's real BD_ADDR and field 546 which normally contains the user's current clock value. In accordance with the invention, the user's device 100 substitutes a pseudonym address BD_ADDR(5) for the user's Bluetooth Device Address BD_ADDR(0). The address manager table 232 shown in FIG. 2 stores the user's pseudonym address BD_ADDR(5) instead of its real BD_ADDR(0) for its relationship with the remote paged device. As a result, the remote paged device cannot track the usage of the user's device 100 or discover the real, unique BD_ADDR(0) of the device 100.

Figure 4D:
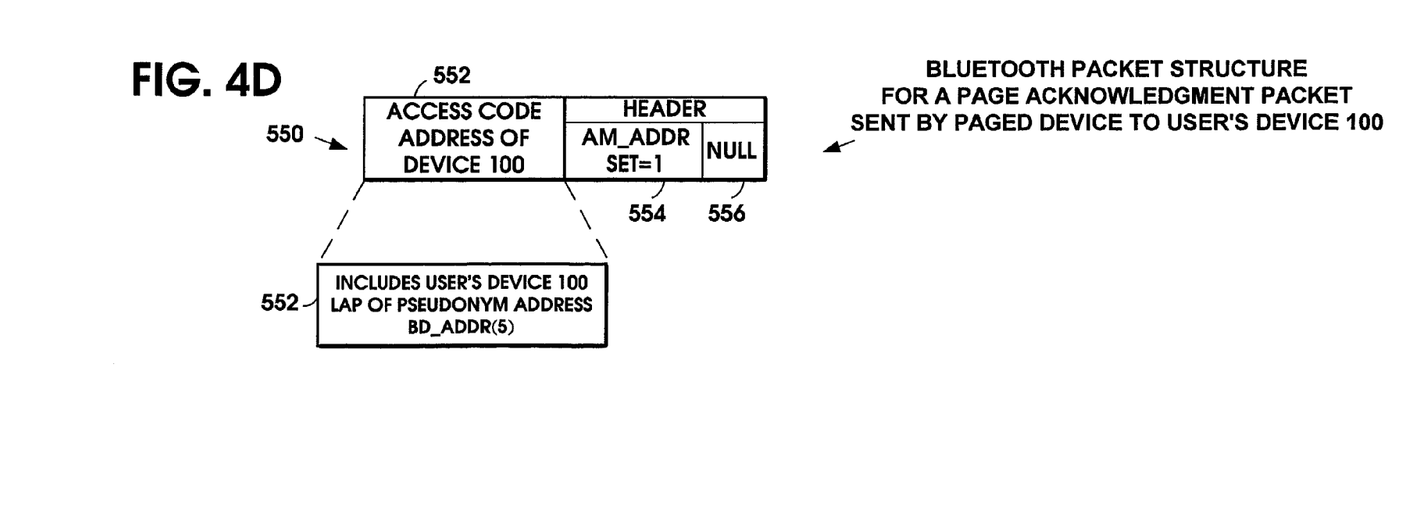
FIG. 4D shows the Bluetooth packet structure for a page acknowledgment packet sent by the paged device to the user's device 100.

FIG. 4D shows the Bluetooth packet structure for a page acknowledgment packet 550 sent by the paged device back to the user's device 100. Packet 550 includes the access code field 552 for the user's device 100 and the header which contains field 554 with the slave member number AM_ADDR set to one for the remote paged device. Field 556 is null. Importantly, the remote paged device only knows the user's device by its pseudonym address BD_ADDR(5). Thus, the access code field 552 that it returns to the user's device 100 contains a synchronization word that includes the lower address part (LAP) of the user's pseudonym address BD_ADDR(5), instead of the LAP of the user device's real BD_ADDR(0) address which would normally happen. Since the user's device 100 will change its pseudonym address to another value in later, separate connections with this remote device and with other devices, the usage of the user's device 100 cannot be tracked and the real, unique BD_ADDR(0) of the device 100 cannot be discovered.

In an alternate embodiment of the invention, a table containing a plurality candidate pseudonym addresses can be computed by the wireless device 100 prior to when they are needed and then stockpiled by storage in the user's device 100. The table of candidate addresses can be stored as a part of the address management table 232. The wireless device 100 can then quickly access one of the candidate pseudonym addresses by a random selection from the table of candidate addresses. In another alternate embodiment, the table of candidate pseudonym addresses can be computed by a server and then securely downloaded to the wireless device 100 prior to when they are needed and then stockpiled by storage in the user's device 100. In still another alternate embodiment, the table of candidate pseudonym addresses can be computed by the manufacturer of the wireless device 100 and then stored in the wireless device 100.

The resulting invention provides a randomized pseudonym address for a Bluetooth device so that the user's identity, routes, and activities cannot be correlated with his/her device's address.

In addition to the Bluetooth standard, the invention also applies to other wireless standards. The invention's principle of substituting randomized pseudonym addresses for the device's real unique address, to confer anonymity upon the user, is equally useful in many other wireless standards. The invention applies, for example, to the IEEE 802.11 Wireless LAN standards, the Japanese 3rd Generation (3G) wireless standard, the various 2G, 2.5G, and 3G cellular telephone system standards, the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the High Performance Radio Local Area Network (HIPERLAN) standard, and the Multimedia Mobile Access Communication (MMAC) Systems standard of the Japanese Association of Radio Industries and Businesses. The invention enables each of these wireless standards to protect the privacy of the user's identity, routes, and activities so that they cannot be correlated with his/her device's address.

Although a specific embodiment of the invention has been disclosed, it will be understood by those having skill in the art that changes can be made to the specific embodiment without departing from the spirit and the scope of the invention.

What is claimed is:

1. A method in a wireless device to prevent user's identity, routes, or activities from being correlated with the user's real device address in a wireless communication, comprising:
    forming a pseudonym address by initiating in the wireless device a random number generator responsive to a random sequence or a pseudo random sequence and the wireless device real address for generating the pseudonym address as a substitute for the real device address; and
    using the pseudonym address in protocol functions of the device that normally uses the real device address in wireless messaging.

2. The method of claim 1, which further comprises:
    initiating in the wireless device the pseudonym address as a randomized version of the real device address.

3. The method of claim 1, which further comprises:
    using the pseudonym address in packet address functions of the device that normally uses the real device address.

4. The method of claim 1, which further comprises:
    using the pseudonym address in modulation functions of the device that normally use the real device address.

5. The method of claim 4, which further comprises:
    using the pseudonym address in frequency hopping sequence modulation functions of the device that normally use the real device address.

6. The method of claim 1, which further comprises:
    using the pseudonym address in device access code functions of the device that normally use the real device address.

7. The method of claim 1, which further comprises:
using the pseudonym address in link encryption functions of the device that normally use the real device address.

8. The method of claim 1, which further comprises:
using the pseudonym address in authentication functions of the device that normally use the real device address.

9. The method of claim 1, which further comprises:
enabling the user to select a parameter to combine with the real device address and randomize it to form the pseudonym address.

10. The method of claim 1, which further comprises:
enabling the user to select a true random number to combine with the real device address and randomize it to form the pseudonym address.

11. The method of claim 1, which further comprises:
storing the pseudonym address and associating it with a paired device with which the pseudonym address is exchanged.

12. The method of claim 1, which further comprises:
using the pseudonym address for a predetermined time or count selected by the user.

13. The method of claim 1, which further comprises:
using the pseudonym address for a duration that at least begins with an inquiry received from another device and ends if no connection is made after the inquiry.

14. The method of claim 1, which further comprises:
using the pseudonym address for a duration that at least begins with an inquiry by the user's device and ends if no connection is made after the inquiry.

15. The method of claim 1, which further comprises:
using the pseudonym address for a duration that ends when a piconet context changes for the user's device.

16. The method of claim 1, which further comprises:
using the pseudonym address for a duration that at least begins with sensing of a current physical location of the user's device, and ends if that physical location changes beyond a predefined distance.

17. The method of claim 1, which further comprises:
using the pseudonym address for a duration that at least begins with an inquiry that establishes a connection with another device, and ends when that connection is terminated.

18. The method of claim 1, which further comprises:
comparing a newly generated pseudonym address with known addresses of other devices;
discarding the newly generated pseudonym address if it duplicates the known addresses of other devices; and
generating another pseudonym address.

19. The method of claim 18, which further comprises:
notifying the user if there are many repeated attempts to generate a pseudonym address that fail because of other duplicate addresses; and
enabling the user to modify a randomization of the real device address to generate another pseudonym address.

20. The method of claim 1, wherein the wireless device principle of operation is the Bluetooth standard.

21. The method of claim 1, wherein the wireless device principle of operation is a IEEE 802.11 Wireless LAN standard.

22. The method of claim 1, wherein the wireless device principle of operation is the Japanese 3rd Generation (3G) wireless standard.

23. The method of claim 1, wherein the wireless device principle of operation is a cellular telephone system standard.

24. The method of claim 1, wherein the wireless device principle of operation is the Infrared Data Association (IrDA) standard.

25. The method of claim 1, wherein the wireless device principle of operation is the Digital Enhanced Cordless Telecommunications (DECT) standard.

26. The method of claim 1, wherein the wireless device principle of operation is the Shared Wireless Access Protocol (SWAP) standard.

27. The method of claim 1, wherein the wireless device principle of operation is the IEEE 802.15 Wireless Personal Area Network (WPAN) standard.

28. The method of claim 1, wherein the wireless device principle of operation is the High Performance Radio Local Area Network (HIPERLAN) standard.

29. The method of claim 1, wherein the wireless device principle of operation is the Multimedia Mobile Access Communication (MMAC) Systems standard.

30. A system for a wireless device to prevent a user's identity, routes, or activities from being correlated with the user's real device address in a wireless communication, comprising:
a random number generator in the wireless device, the generator responsive to a random sequence or pseudo random sequence and the wireless device real address for initiating a pseudonym address as a substitute for the real device address in a wireless communication; and
a processor coupled to the generator, for using the pseudonym address in protocol functions of the device that normally use the real device address.

31. The system of claim 30, which further comprises:
said generator initiating the pseudonym address as a randomized version of the real device address.

32. The system of claim 30, which further comprises:
said processor using the pseudonym address in packet address functions of the device that normally use the real device address.

33. The system of claim 30, which further comprises:
said processor using the pseudonym address in modulation functions of the device that normally use the real device address.

34. The system of claim 33, which further comprises:
said processor using the pseudonym address in frequency hopping sequence modulation functions of the device that normally use the real device address.

35. The system of claim 30, which further comprises:
said processor using the pseudonym address in device access code functions of the device that normally use the real device address.

36. The system of claim 30, which further comprises:
said processor using the pseudonym address in link encryption functions of the device that normally use the real device address.

37. The system of claim 30, which further comprises:
said processor using the pseudonym address in authentication functions of the device that normally use the real device address.

38. The system of claim 30, which further comprises:
an interface coupled to the processor, for enabling the user to select a part of the real device address and randomize it to form the pseudonym address.

39. The system of claim 30, which further comprises:
an interface coupled to the processor, for enabling the user to select a parameter to combine with the real device address and randomize it to form the pseudonym address.

40. The system of claim 30, which further comprises:
an interface coupled to the processor, for enabling the user to select a true random number to combine with the real device address and randomize it to form the pseudonym address.

41. The system of claim 30, which further comprises:
a memory coupled to the processor, for storing the pseudonym address and associating it with a paired device with which the pseudonym address is exchanged.

42. The system of claim 30, which further comprises:
a memory coupled to the processor, for retaining the pseudonym address for a predetermined time or count selected by the user.

43. The system of claim 30, which further comprises:
a memory coupled to the processor, for retaining the pseudonym address for a duration that at least begins with an inquiry received from another device and ends if no connection is made after the inquiry.

44. The system of claim 30, which further comprises:
a memory coupled to the processor, for retaining the pseudonym address for a duration that at least begins with an inquiry by the user's device and ends if no connection is made after the inquiry.

45. The system of claim 30, which further comprises:
a memory coupled to the processor, for retaining the pseudonym address for a duration that ends when a piconet context changes for the user's device.

46. The system of claim 30, which further comprises:
a memory coupled to the processor, for retaining the pseudonym address for a duration that at least begins with sensing of a current physical location of the user's device, and ends if that physical location changes beyond a predefined distance.

47. The system of claim 30, which further comprises:
a memory coupled to the processor, for retaining the pseudonym address for a duration that at least begins with an inquiry that establishes a connection with another device, and ends when that connection is terminated.

48. The system of claim 30, which further comprises:
said processor comparing a newly generated pseudonym address with known addresses of other devices;
said processor discarding the newly generated pseudonym address if it duplicates the known addresses of other devices; and
said generator generating another pseudonym address.

49. The system of claim 48, which further comprises:
an interface coupled to the processor, for notifying the user if there are many repeated attempts to generate a pseudonym address that fail because of other duplicate addresses; and
said interface enabling the user to modify a randomization of the real device address to generate another pseudonym address.

50. The system of claim 30, wherein the wireless device principle of operation is the Bluetooth standard.

51. The system of claim 30, wherein the wireless device principle of operation is a IEEE 802.11 Wireless LAN standard.

52. The system of claim 30, wherein the wireless device principle of operation is the Japanese 3rd Generation (3) wireless standard.

53. The system of claim 30, wherein the wireless device principle of operation is a cellular telephone system standard.

54. The system of claim 30, wherein the wireless device principle of operation is the Infrared Data Association (IrDA) standard.

55. The system of claim 30, wherein the wireless device principle of operation is the Digital Enhanced Cordless Telecommunications (DECT) standard.

56. The system of claim 30, wherein the wireless device principle of operation is the Shared Wireless Access Protocol (SWAP) standard.

57. The system of claim 30, wherein the wireless device principle of operation is the IEEE 802.15 Wireless Personal Area Network (WPAN) standard.

58. The system of claim 30, wherein the wireless device principle of operation is the High Performance Radio Local Area Network (HIPERLAN) standard.

59. The system of claim 30, wherein the wireless device principle of operation is the Multimedia Mobile Access Communication (MMAC) Systems standard.

60. A method in a wireless device to prevent a user's identity, routes, or activities from being correlated with the user's real device address in a wireless communication, comprising:
initiating in a wireless device a random number generator response to a random sequence or a pseudo random sequence and the wireless device real address for generating a pseudonym address in the wireless device as a randomized version of the real device address;
substituting the pseudonym address for the real device address in wireless messaging; and
using the pseudonym address in protocol functions of the device that normally use the real device address in the wireless messaging.

61. A method in a wireless device to prevent a user's identity, routes, or activities from being correlated with the user's real device address in a wireless communication, comprising:
enabling the user to select in the wireless device a part of the real device address;
forming a pseudonym address by initiating a random number generator responsive to a random sequence or pseudo random sequence and the real device real address to randomize the first part of the real device address to form a first part of a pseudonym address;
combining in the wireless device a remaining part of the real device address with the first part of the pseudonym address to form a complete pseudonym address;
substituting in the wireless device the complete pseudonym address for the real device address; and
using the complete pseudonym address in protocol functions of the device that normally use the real device address.

62. A method in a wireless device to prevent a user's identity, routes, or activities from being correlated with the user's real device address in a wireless communication, comprising:
enabling the user in the wireless device to select a parameter to combine with the real device address;
forming a pseudonym address by combining in the wireless device the parameter with the real device address and forming a random number as a the pseudonym address;
substituting in the wireless device the pseudonym address for the real device address; and
using the pseudonym address in protocol functions of the device that normally use the real device address.

63. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in protocol functions of the device that normally use the real device address; and using the pseudonym address for a predetermined time or count.

64. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in protocol functions of the device that normally use the real device address; and using the pseudonym address for a duration that at least begins with an inquiry received from another device and ends if no connection is made after the inquiry.

65. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in functions of the device that normally use the real device address; and using the pseudonym address for a duration that at least begins with an inquiry by the user's device and ends if no connection is made after the inquiry.

66. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in protocol functions of the device that normally use the real device address; and using the pseudonym address for a duration that ends when a piconet context changes for the user's device.

67. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in protocol functions of the device that normally use the real device address; and using the pseudonym address for a duration that at least begins with sensing of a current physical location of the user's device, and ends if that physical location changes beyond a predefined distance.

68. A method in a wireless device to prevent a user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

substituting in the wireless device the pseudonym address for the real device address;

using the pseudonym address in protocol functions of the device that normally use the real device address; and using the pseudonym address for a duration that at least begins with an inquiry that establishes a connection with another device, and ends when that connection is terminated.

69. A method in a wireless device to prevent the user's identity, routes, or activities from being correlated with the user's real device address in a wireless communication, comprising:

forming a pseudonym address by initiating in the wireless device a random number generator responsive to random sequences or pseudo random sequences and a user's real device address for generating the pseudonym address as a randomized version of the real device address;

comparing in the wireless device the pseudonym address with known addresses of other devices;

notifying the user if there are repeated attempts to generate a pseudonym address that fails because of duplicate addresses of other devices;

enabling the user to specify a modified randomization of the real device address;

performing in the wireless device the modified randomization and generating a new pseudonym address from the real device address; and using the new pseudonym address in protocol functions of the device that normally use the real device address.

70. A computer program product for a Bluetooth wireless device to prevent a user's identity, routes, or activities from being correlated with the user's real device address in a wireless communication, comprising:

a computer readable medium in the wireless device;

program code in said computer readable medium for forming a pseudonym address by initiating in the wireless device a random number generator responsive to random sequences or pseudo random sequences and a user's real device address for generating the pseudonym address as a randomized version of the real device address;

program code in said computer readable medium for substituting the pseudonym address for the real Bluetooth device address; and program code in said computer readable medium for using the pseudonym address in protocol functions of the device that normally use the real Bluetooth device address.

71. A system for a wireless device to prevent the user's identity, routes, or activities from being correlated with the user's real device address in a wireless communication, comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address; and said processor using the one pseudonym address in protocol functions of the device that normally use the real device address.

72. A system for a wireless device to prevent a user's identity, routes, or activities from being correlated with the user's real device address in a wireless communication, comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

processor in the wireless device coupled to the memory, for substituting one of the pseudonym addresses for the real device address;

said processor using the one pseudonym address in protocol functions of the device that normally use the real device address; and said processor using the one pseudonym address for a predetermined time or count.

73. A system for a wireless device to prevent a user's identity, routes, or activities from being correlated with the user's real device address in a wireless communication comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address;

said processor using the one pseudonym address in functions of the device that normally use the real device address; and said processor using the one pseudonym address for a duration that at least begins with an inquiry received from another device and ends if no connection is made after the inquiry.

74. A system for a wireless device to prevent a user's identity, routes, or activities from being correlated with the user's real device address in a wireless communication, comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address;

said processor using the one pseudonym address in functions of the device that normally use the real device address; and said processor using the one pseudonym address for a duration that at least begins with an inquiry by the user's device and ends if no connection is made after the inquiry.

75. A system for a wireless device to prevent a-user's identity, routes, or activities from being correlated with the user's real device address in a wireless communication, comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address;

said processor using the one pseudonym address in functions of the device that normally use the real device address; and said processor using the one pseudonym address for a duration that ends when a piconet context changes for the user's device.

76. A system for a wireless device to prevent a user's identity, routes, or activities from being correlated with the user's real device address in a wireless communication comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address;

said processor using the one pseudonym address in functions of the device that normally use the real device address; and said processor using the one pseudonym address for a duration that at least begins with sensing of a current physical location of the user's device, and ends if that physical location changes beyond a predefined distance.

77. A system for a wireless device to prevent a user's identity, routes, or activities from being correlated with the user's real device address in a wireless communication, comprising:

a memory in the wireless device storing a plurality of pseudonym addresses, each pseudonym address formed by initiating in the wireless device a random number generator responsive to random sequences or pseudo random sequences and a user's real device address for generating the pseudonym address as a randomized version of the real device address;

a processor in the wireless device coupled to the memory, for substituting one of the pseudonym addresses for the real device address;

said processor using the one pseudonym address in protocol functions of the device that normally use the real device address; and said processor using the one pseudonym address for a duration that at least begins with an inquiry that establishes a connection with another device, and ends when that connection is terminated.

78. A method in a wireless device to prevent user's identity, routes, or activities from being correlated with the user's real device address in a wireless communication, comprising:

forming a pseudonym address by initiating in a wireless device a random number generator responsive to random sequences or pseudo random sequences and a user's real device address for generating the pseudonym address as a randomized version of the real device address;

enabling the user to select and randomize a part of the real device address in forming the pseudonym address, and using the pseudonym address in protocol functions of the device that normally uses the real device address in wireless messaging.

* * * * *